United States Patent
Islam et al.

(10) Patent No.: US 6,754,229 B1
(45) Date of Patent: Jun. 22, 2004

(54) HASHING ALGORITHM FOR A QUICK PAGING CHANNEL

(75) Inventors: Khaledul Islam, Nepean (CA); Arun Munie, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/539,204

(22) Filed: Mar. 30, 2000

(51) Int. Cl.[7] ............................... H04J 3/16; H04J 3/22
(52) U.S. Cl. .................. 370/468; 370/329; 370/336; 370/341; 370/345; 455/458; 455/509; 455/515
(58) Field of Search ........................... 370/311, 318, 370/320, 329, 335, 342, 437, 441, 395.32, 468, 321, 330, 336, 337, 347, 341, 345; 455/13.4, 456, 457, 458, 509, 515, 522, 574

(56) References Cited

U.S. PATENT DOCUMENTS

| | | | |
|---|---|---|---|
| 6,138,034 A | * 10/2000 | Willey | 455/522 |
| 6,216,004 B1 | * 4/2001 | Tiedemann, Jr. et al. | 370/331 |
| 6,307,846 B1 | * 10/2001 | Willey | 370/329 |
| 6,393,295 B1 | * 5/2002 | Butler et al. | 370/342 |
| 6,421,540 B1 | * 7/2002 | Gilhousen et al. | 455/458 |
| 6,505,058 B1 | * 1/2003 | Willey | 455/574 |

* cited by examiner

*Primary Examiner*—Phirin Sam
(74) *Attorney, Agent, or Firm*—Gibbons, Del Deo, Dolan, Griffinger & Vecchione, P.C.

(57) ABSTRACT

The present invention provides an improved method of alerting a remote device in an idle state over a channel. A value $R_1$, which is the location of an initial PI bit within an initial half of at least one time slot on the channel, is computed based on a hashing algorithm defined in IS-2000 that uses information about the remote device. The initial indicator bit is assigned a binary value by the base station. Then, a value $R_2$, which is the location of a further bit on a further half of the at least one time slot on the channel, is computed based on an improved hashing algorithm. Then, the further indicator bit is assigned a binary value by the base station. Then, the remote device in the idle state is alerted over the channel based on the assigned bit location $R_1$ and further bit location $R_2$.

13 Claims, 4 Drawing Sheets

---

HASH_KEY = the least 32 significant bits of encoded IMSI
L = bits 0-15 of HASH_KEY           H = bits 16-31 of HASH_KEY
$L_{10}$ = bits 0-9 of L
N = 376 (Quick Paging Full Rate)    N = 188 (Quick Paging Half Rate)
M = 8 (Quick Paging Full Rate)      M = 4 (Quick Paging Half Rate)
t = CDMA system time in frames
$\lfloor x \rfloor$ = floor function such that $\lfloor x \rfloor$ is the largest integer $\leq x$
$\lceil x \rceil$ = ceiling function such that $\lceil x \rceil$ is the smallest intger $\geq x$ $$DECORR_1 = \left\lfloor \frac{t}{64} \right\rfloor \bmod 2^{16}$$

---

The $R_1$ is computed as (same as the standards)

♦ $R_1 = \lfloor N \times f_1 \rfloor$ where the random fraction $f_1$ is defined as $$f_1 = ((40503 \times (L \oplus H \oplus DECORR_1)) \bmod 2^{16})/2^{16}$$

The $R_2$ is computed as

♦ $R_2 = N + M + \left\lfloor \frac{2 \times R_1}{N + M} \right\rfloor \times \frac{N+M}{2} + \left(\left(\frac{L_{10} + M + 1}{2^{10}} \times S + R_1\right) \bmod S\right)$ where $S$ indicates the number of bits in the assigned frame (i.e. 3rd of 4th)

$$S = \left(1 - \left\lfloor \frac{2 \times R_1}{N+M} \right\rfloor\right) \times \frac{N+M}{2} + \left\lfloor \frac{2 \times R_1}{N+M} \right\rfloor \times \left(\frac{N+M}{2} - M\right)$$

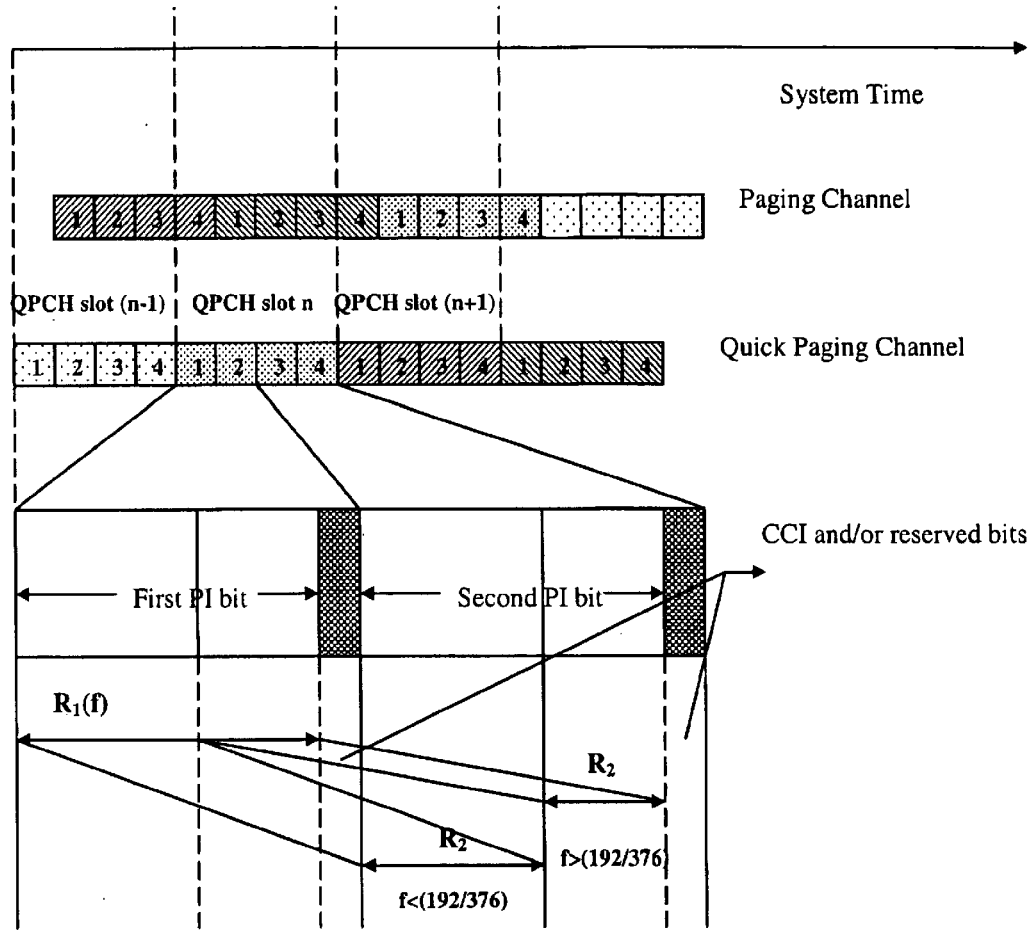

Figure 2

HASH_KEY = the least 32 significant bits of encoded IMSI

L = bits 0-15 of HASH_KEY      H = bits 16-31 of HASH_KEY

N = 376 (Quick Paging Full Rate)      N = 188 (Quick Paging Half Rate)

M = 8 (Quick Paging Full Rate)      M = 4 (Quick Paging Half Rate)

t = CDMA system time in frames $\lfloor x \rfloor$ = floor function such that $\lfloor x \rfloor$ is the largest integer $\leq x$ $\lceil x \rceil$ = ceiling function such that $\lceil x \rceil$ is the smallest intger $\geq x$ $\text{DECORR}_1 = \left\lfloor \dfrac{t}{64} \right\rfloor \bmod 2^{16}$      $\text{DECORR}_2 = \left\lfloor \dfrac{t}{64} + 1 \right\rfloor \bmod 2^{16}$

---

The $R_1$ is computed as

- $R_1 = \lfloor N \times f_1 \rfloor$ where the random fraction $f_1$ is defined as $$f_1 = \left((40503 \times (L \oplus H \oplus DECORR_1)) \bmod 2^{16}\right)/2^{16}$$

The $R_2$ is computed as (simplied version of the equation)

- $R_2 = N + M + \left\lfloor \dfrac{2 \times R_1}{N+M} \right\rfloor \times \dfrac{N+M}{2} + \lfloor S \times f_2 \rfloor$ where $S$ indicates the number of bits in the assigned frame (i.e. 3$^{rd}$ of 4$^{th}$)

- $S = \left(1 - \left\lfloor \dfrac{2 \times R_1}{N+M} \right\rfloor\right) \times \dfrac{N+M}{2} + \left\lfloor \dfrac{2 \times R_1}{N+M} \right\rfloor \times \left(\dfrac{N+M}{2} - M\right)$ $$f_2 = \left((40503 \times (L \oplus H \oplus DECORR_2)) \bmod 2^{16}\right)/2^{16}$$

Figure 3

HASH_KEY = the least 32 significant bits of encoded IMSI

L = bits 0-15 of HASH_KEY       H = bits 16-31 of HASH_KEY $L_{10}$ = bits 0-9 of L N = 376 (Quick Paging Full Rate)    N = 188 (Quick Paging Half Rate)

M = 8 (Quick Paging Full Rate)      M = 4 (Quick Paging Half Rate)

t = CDMA system time in frames $\lfloor x \rfloor$ = floor function such that $\lfloor x \rfloor$ is the largest integer $\leq x$ $\lceil x \rceil$ = ceiling function such that $\lceil x \rceil$ is the smallest intger $\geq$ x $$DECORR_1 = \left\lfloor \frac{t}{64} \right\rfloor \mod 2^{16}$$

The $R_1$ is computed as (same as the standards)

- $R_1 = \lfloor N \times f_1 \rfloor$ where the random fraction $f_1$ is defined as $$f_1 = \left((40503 \times (L \oplus H \oplus DECORR_1)) \mod 2^{16}\right)/2^{16}$$

The $R_2$ is computed as

- $R_2 = N + M + \left\lfloor \frac{2 \times R_1}{N+M} \right\rfloor \times \frac{N+M}{2} + \left(\left(\frac{L_{10}+M+1}{2^{10}} \times S + R_1\right) \mod S\right)$ where S indicates the number of bits in the assigned frame (i.e. $3^{rd}$ of $4^{th}$)

$$S = \left(1 - \left\lfloor \frac{2 \times R_1}{N+M} \right\rfloor\right) \times \frac{N+M}{2} + \left\lfloor \frac{2 \times R_1}{N+M} \right\rfloor \times \left(\frac{N+M}{2} - M\right)$$

HASHING ALGORITHM FOR A QUICK PAGING CHANNEL

FIELD OF THE INVENTION

The present invention relates to the transmission of an alert message from a base station to a mobile station. More particularly, this invention relates to improving the transmission of an alert message from the base station to the mobile station.

BACKGROUND OF THE INVENTION

In a typical wireless communication system, such as a cellular or Personal Communications Systems (PCS) network, a base station system having a controller and a plurality of transmitters and receivers communicates with a switching center and with a plurality of mobile communication units. Multiple access wireless communication between the base station and the mobile station occurs via RF channels which provide paths over which communication signals such as voice, data and video are transmitted. Base-to-mobile station communications are said to occur on a forward or down-link channel, while mobile-to-base station communications are referred to as being on a reverse or up-link channel.

To conserve the battery power of a mobile station used in a cellular or PCS network that employs Code Division Multiple Access (CDMA), the mobile station may operate in a "slotted mode" when not handling telephone calls or when not receiving information about the network, such as information about the serving cell and neighboring cells. While operating in the slotted mode, the mobile station periodically monitors only those time slots on a forward-link paging channel (PCH), which are assigned to the mobile station to determine whether a base station is attempting to deliver an incoming call or message to it. The PCH slots are determined by using a hashing function that is based on mobile station-specific International Mobile Station Identity (IMSI). The IMSI is 34-bit binary encoded representation of the telephone number of the mobile station as per TIA/EIA IS-95, hereby incorporated by reference. At other times, the mobile station remains in an idle or standby state. However, because the PCH is shared by many mobile stations and carries both time slotted and non-time slotted messages, the PCH may carry information not intended for the mobile station in the mobile station's time slot. A typical mobile station that employs a PCH is NOKIA® 6185 of Nokia Americas, 6000 Connection Drive, Irving, Tex. 75039, which monitors appropriate time slots on the PCH based on its IMSI. The mobile station must be periodically activated to monitor its assigned time slots, regardless of whether that time slot contains information intended for the mobile station or not. Thus, the mobile station needlessly consumes power when the base station sends a slotted message not intended for the instant mobile station because the mobile station must monitor every time slot assigned to it and may be required to monitor up to two time slots in every slot cycle.

To further conserve power, a new forward-link channel called quick paging channel (QPCH) has been added as part of the TIA/EIA IS-2000 wireless communication standard, hereby incorporated by reference. This new standard, which defines the over the air-interface for third generation CDMA system, corresponds to protocol revision 6. The QPCH is employed by the base station to alert an idle mobile station to activate and receive information carried by the PCH starting from its next assigned PCH time slot. Starting from the second phase of IS-2000, which corresponds to protocol revision 7, QPCH could also be used to indicate messages arriving in Forward Common Control Channel (F-CCCH). The QPCH is also divided into time slots comprised of pairs of bits which are known as paging indicator (PI) bits as well as into reserved and/or configuration change indicator (CCI) bits. For a given mobile station, the positions of the two PI bits within the QPCH slot are determined by a hashing algorithm employed by the base station and the mobile station. The mobile station turns on at the time that it is to receive its assigned PI bits on the QPCH. When both PI bits have been set to the value ON by the base station, the mobile station remains active to receive slotted information transmitted over the PCH. Alternatively when one or both of the PI bits have been set to the value OFF, the mobile station returns to its idle state until the next time that it is to receive PI bits.

However, the QPCH PI bits assigned to a specific mobile station may precede the corresponding PCH time slot by as much as 100 ms so that it is possible for the base station to turn ON the two PI bits assigned to a respective mobile station to indicate the presence of a slotted message in the paging channel and then be unable to send the message in the corresponding PCH time slot because of PCH overload. When the base station turns both PI bits ON to alert a single mobile station that a message is forthcoming, there is always a possibility that other mobile stations may be falsely alerted because all possible phone numbers are assigned to only a limited number of PI pairs. Thus, the battery power of a mobile station may be needlessly consumed when the mobile station incorrectly receives one or both PI bits on a PCH time slot when the PI bits should be received on a PCH time slot on another mobile station.

Accordingly, there exists a need for an improved way of computing the location of PI bit to enable the base station to alert the correct mobile station.

SUMMARY OF THE INVENTION

The present invention provides an improved method of alerting a remote device in an idle state over a channel. A value $R_1$, which is the location of an initial PI bit within an initial half of at least one time slot on the channel, is computed based on a hashing algorithm defined in IS-2000 that uses information about the remote device. The initial indicator bit is assigned a binary value by the base station. Then, a value $R_2$, which is the location of a further bit on a further half of the at least one time slot on the channel, is computed based on an improved hashing algorithm. Then, the further indicator bit is assigned a binary value by the base station. Then, the remote device in the idle state is alerted over the channel based on the assigned bit location $R_1$ and further bit location $R_2$.

Other aspects and features of the present invention will become apparent to those of ordinary skilled in the art upon review of the following description of specific embodiments of the invention in conjunction with the accompanying figures.

BRIEF DESCRIPTION OF THE DRAWINGS

The invention will be more clearly understood by reference to the following detailed description of an exemplary embodiment in conjunction with the accompanying drawings, in which:

FIG. 1 depicts the relative timing of an IS-2000 paging channel and a quick paging channel;

FIG. 2 illustrates a conventional hashing algorithm as defined in the IS-2000 standard;

FIG. 3 illustrates an embodiment of a hashing algorithm employed by the present invention.

DESCRIPTION OF THE INVENTION

Figure 4:
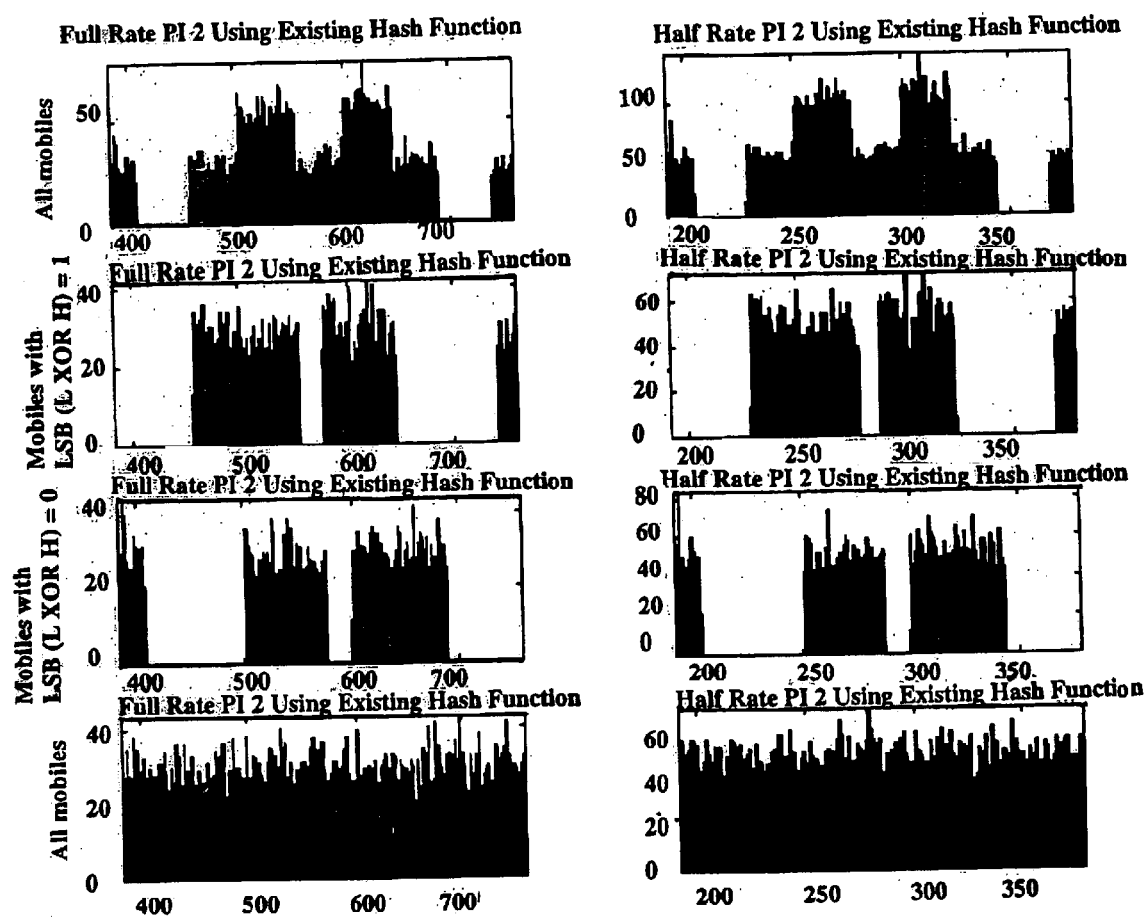
FIG. 4 illustrates a simulation example that compares a conventional hashing algorithm and an embodiment of a hashing algorithm employed by the present invention.

In the following detailed description of the invention reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention.

FIG. 1, depicts the relative timing of the IS-2000 PCH and QPCH. Each channel is divided into a plurality of time slots, and each time slot is further divided into four frames. Each time slot is typically 80 ms in duration. Additionally, up to eight reserved bits are located after the second and fourth frames of the QPCH, and up to four CCI bits may be located after the reserved bits. The first bit of a QPCH time slot precedes the first bit of a corresponding PCH time slot by a time interval of typically 100 ms, or the duration of five 20 ms frames, so that for example, there is a 20 ms interval between the end of the nth QPCH time slot and the first bit of the nth PCH time slot.

According to the standard, the first PI bit may be located in the first frame of the time slot, and the second PI bit may be located in the third frame. Alternatively, the first PI bit is located in the second frame, and the second PI bit is located in the fourth frame.

Typically, the location of the PI bits within the frames is determined by a hashing algorithm based on information specific to the respective mobile station.

FIG. 2, depicts of a conventional Hashing algorithm. Typically, the computation of $R_1$ and $R_2$ is accomplished by employing a conventional application program that includes the hashing algorithm on base station and on mobile station. The application program is located on a typical base and mobile stations utilizing CDMA-2000 technology, such as IS-2000 protocol revision 6. For example, the equation in FIG. 2 may employ a mobile station that is assigned a telephone number (613) 763-9348 and has the following parameters:

Number of paging channels=1;

Number of quick paging channels=1;

Slot cycle index=0;

Mobile phone number=(613) 763-9348;

Encoded IMSI=1F6A324ED in hexadecimal notation;

L=24ED (in hexadecimal notation)=10010011101101 (in binary notation);

$L_{10}$=ED (in hexadecimal notation )=0011101101 (in binary notation);

H=F6A3 (in hexadecimal notation)=1111011010100011 (in binary notation);

$DECORR_1$=(50352 in decimal notation);

t, the system time in frame=757B12C03 (in hexadecimal notation);

The conventional application program that uses the conventional hashing algorithm, such as the one defined in IS-2000 standard, for the full rate QPCH will produce $R_1$=265 and $R_2$=635 where N=376, M=8, S=184. The $R_1$ may span the first and second frames of the QPCH slot. In the first frame, $R_1$ has a range of 0–191, and the second frame of $R_1$ has a range of 192–375 in the bit stream sent in a QPCH slot. The $R_2$ may span the third and fourth frames of the QPCH slot. The $R_2$ in third frame of has a range of 384–575, and the $R_2$ in the fourth frame has a range of 576–759 of the bit stream sent in a QPCH slot. Each bit in the bit-stream located in the range 0–759 has a value of 0 or 1 (OFF or ON). The mobile station will respond to the alert by tuning on to PCH only if the base station sets its assigned PI pair at $R_1$ and $R_2$ equal to 1. If the value of either of the PI bits located at $R_1$ and $R_2$ is 0, then the mobile station will ignore the alert. If location of the initial PI bit falls in frame 1, then location of the further PI bit falls in frame 3. Similarly, if location of initial PI bit falls in frame 2, then location of the further PI bit falls in frame 4. Thus, as in the example, $R_1$ is 265 so the initial PI bit that can have the value of 0 or 1 is placed in frame 2, and $R_2$ is 635 so the further PI bit that can have the value of 0 or 1 is placed in the fourth frame. Also, the half rate for QPCH will produce $R_1$=132 and $R_2$=317 where N=188, M=4, S=92.

The computation of $R_1$ includes generating a random fraction $f_1$ which is computed by using a "randomizing function" which is adapted from, *The Art of Computer Programming*, by Donald N. Knuth. First, the value of $f_1$ spans between 0 and 1. Next, the randomizing function uses the least significant 32 bits of binary-encoded IMSI to yield different PI locations for different mobile stations. The IMSI encoded bits are represented by values L and H. L represents bits 0–15 of IMSI. H represents bits 16–31 of IMSI.

Further, each mobile station employs the value $DECORR_1$ in order to change the location of the initial PI bit with respect to time. $DECORR_1$ is calculated by dividing t, the system time in frames, by 64. The value of t is an absolute time that represents the number of frames sent since the beginning of the CDMA system time, which is Jan. 6, 1980, 12:00 am. The value of $DECORR_1$ changes every 64 frames and alternates between even and odd values. N is the total number of PI pairs sent in a QPCH time slot. At half rate, N is 188 and at full rate, N is 376. M is the reserved bits or the CCI bits in second or fourth frame. At half rate, M is 4 and at full rate M is 8. Next, the integer value of the product of total number of first PI bits and $f_1$ yields the value of $R_1$.

The $R_2$ computation includes an offset value that is calculated depending on whether $R_1$ was in the first or second frame of the QPCH time slot. The offset value is employed to place $R_2$ into either third or fourth frame of the QPCH time slot. This computation can be determined by whether $f_1<(192/376)^2$. In addition, the value of S is calculated depending on whether $R_1$ was in the first or second frame of the QPCH slot and is equal to the number of PI bits in the corresponding frame in the second half of QPCH slot. Finally, a random number of bits (i.e. random offset) is added to the offset to produce $R_2$. The random offset is obtained by multiplying S with a random fraction $f_2$ that is obtained via another "randomizing function." This function is identical to that of $R_1$ except for $DECORR_2$ which is equal to $DECORR_1+1$. When $DECORR_1$ is even, only the last bit of $DECORR_2$ is different from $DECORR_1$. This makes each mobile station assigned to only about half of the bits in the frame. When $DECORR_1$ is an even number, then it can be shown that not all the PI locations are used in the second half of QPCH slot. In this case, the number of unused bits in the second half of QPCH slot can be expressed in the following closed-form:

$$\text{Number of unused bits} = \left\lfloor 0.382 \times \frac{N+M}{2} \right\rfloor -$$

$$\left\lceil 0.128 \times \frac{N+M}{2} \right\rceil + \left\lfloor 0.892 \times \frac{N-M}{2} \right\rfloor - \left\lceil 0.618 \times \frac{N-M}{2} \right\rceil$$

When the $DECORR_1$ is an even number,

Number of unused bits in 2nd half of $QPCH$ slot =
$$\begin{cases} 98 \text{ for full rate } QPCH \\ 48 \text{ for full rate } QPCH \end{cases}$$

This happens periodically every 128 frames (2.56 seconds), and the trend is seen in 64 frames in each period. In other words, 25% of PI bits remain unused in the second half of QPCH slot for duration of 64 frames in 128-frame time period.

In FIG. 3, there is shown an embodiment of the hashing algorithm employed by the present invention. The improved hashing algorithm differs from the conventional hashing algorithm because second bit $R_2$ is calculated, without using $DECORR_2$. The new algorithm uses the lower three numerical digits of the IMSI as an example of a "key" to the hashing equation. It not only ensures that all the available bits are used quite uniformly, but also reduces the probability of second collision since it is based on the lower three numerical digits of the IMSI. It is possible to use other suitable mobile station specific "keys" that could produce similar results. The new equation uses $(L_{10}+M+1)$ divided by $2^{10}$, instead of using $DECORR_2$. In this improved hashing algorithm example, the value $L_{10}$ represents bits 0–9 of binary encoded IMSI that corresponds to the last 3 numerical digits of the phone number. In addition, the improved hashing algorithm removes the correlation between $R_1$ and $R_2$. The improved algorithm employs the same conventional algorithm as described in FIG. 2 to compute $R_1$. The calculation of the new $R_2$ employs the conventional value for S and the offset is combined with the new equation. The new $R_2$ is uniformly distributed and has a variance that is much lower than that of $R_2$ computed conventionally. Further, the variance of the new $R_2$ is even lower than that of $R_1$. The improved algorithm ensures that all the available bits are employed to send the alert message from base station to mobile station.

The new equation for the hashing algorithm is employed by installing this equation in a conventional application program that utilizes CDMA-2000 technology for communication between a base station and a mobile station. If the new equation is installed onto the application program of the base station and the mobile station, then when the base station sets the PI bits to ON to alert a particular mobile, a smaller number of mobiles are falsely alerted, that a message is forthcoming, compared to the conventional methods. Employing the same parameters as in previous example with the new equation of $R_2$, the full rate for QPCH will produce $R_1=265$ and $R_2=700$, where $N=376$, $M=8$, $S=184$. Also, for half rate QPCH, the new equation will produce $R_1=132$ and $R_2=349$ where $N=188$, $M=4$, $S=92$. In comparing, the value of conventional $R_2$ in FIG. 2 with the new value of $R_2$ in FIG. 3, there is a difference in the value for $R_2$. The value computed for $R_2$ is 700, which is one of the locations that is never used by conventional hashing equation when $DECORR_1$ is even. The proposed equation ensures that no bit location is left out.

Table 1 depicts results of simulation of assignments of PI bit locations employing a conventional hashing algorithm and the improved hashing algorithm. According to FIG. 2 and FIG. 3, $R_1$ and $R_2$ are computed under the conventional and improved hashing algorithms. The values for $R_1$ and $R_2$ are calculated by employing the following parameters: random values of L and H are generated using a fixed mobile station area code 613 and random 7 digit telephone numbers and encoding them to get the coded IMSI; value M is 8 or 4 based on full rate and half rates channels respectively; value N is 376 or 188 based on a full rate and a half rate channels respectively; the slot cycle index is zero; and the frame number at the start of QPCH is equal to 757B12CO3 in hexadecimal notation. Further, the value $DECORR_1$ calculated for this frame number is even. Only the mobiles whose QPCH slots begin at this time (as per the standards) are used. Based on the above parameters, Table 1 exhibits the differences between the $R_2$ values calculated based on the conventional hashing algorithm and the improved hashing algorithm. The simulations with different parameters (e.g. slot cycle index, frame number at the start of QPCH slot, number of quick paging channels) also show similar results.

FIG. 4 provides graphical representation of the simulation using both the conventional hashing algorithm and the improved hashing algorithm based on FIG. 2 and FIG. 3. The simulation results are also summarized in Table 1. The top two graphs, shows that the conventional hashing algorithm leaves a number of unused bits in the second half of QPCH slot both for the half rate and the full rate channels. Further, 64 out of every 128 consecutive frames show this undesired property. The number of unused bits matches that of the analytical results. The second and the third rows of graphs show the results of conventional hashing equation for two sets of mobiles with except that bit 0 of L⊕H of one set is 0 and of the other set is 1.

The top graph is a sum of the second and the third rows. The gaps signify that not all of the bits available on the QPCH are being assigned. The bottom two graphs exhibit the improved hashing algorithm for the full rate and half rate. The $R_2$ is calculated by using the proposed method falls in frames three and four of the time slot of QPCH, which has a range of 384–575 bits, and 576–759 for full rate. If a conventional algorithm is used, there is no uniform distribution of bits on the third and the fourth frame of the QPCH sent from the base station to the mobile station. Non-uniform distribution of bits on the QPCH of an accompanying mobile station increases the likelihood that a base station may contact the wrong mobile. The even distribution of the bits to each frame of the time slot decreases the likelihood that the wrong mobile stations will be contacted. Therefore, the improved hashing algorithm decreases the number of wrong mobile stations contacted by using a new equation by forcing $R_1$ and $R_2$ to uniformly distribute the bits from the base station into the time frames.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover the entire feature of the present invention as described herein, and all statements of the scope of the invention which, as a matter of language, might be said to fall there between.

Having described the invention, what is claimed as new and secured by Letters Patent is:

1. A method of allocating bits over a channel, said method comprising:

assigning a bit associated with a position $R_1$ in a bit stream of at least two frames of at least one time slot of the channel, wherein the $R_1$ has the following relation:

$$R_1 = \lfloor N \times ((40503 \times (L \oplus H \oplus DECORR_1)) \bmod 2^{16})/2^{16} \rfloor,$$

$$DECORR_1 = \lfloor \frac{t}{64} \rfloor \bmod 2^{16}$$

and
further assigning a bit associated with a position $R_2$ in the bit stream of at least two further frames of the at least one time slot of the channel, wherein the $R_2$ has the following relation:

$$R_2 = N + M + \lfloor \frac{2 \times R_1}{N+M} \rfloor \times \left(\frac{N+M}{2}\right) + \left(\left(\frac{L_{10}+M+1}{2^{10}} \times S + R_1\right) \bmod S\right)$$

$$S = \left|\left(\left(1 - \lfloor \frac{2 \times R_1}{N+M} \rfloor\right) \times \left(\frac{N+M}{2}\right) + \lfloor \frac{2 \times R_1}{N+M} \rfloor \times \left(\frac{N-M}{2}\right)\right)\right|$$

wherein M is a number of reserved and configuration change indicator ("CCI") bits associated with the bit associated with the $R_1$ and the further bit associated with the $R_2$ in the at least one time slot, N is a total number of paging indicator ("PI") bits associated with the bit associated with the $R_1$ or the further bit associated with the $R_2$ in the at least two frames of the at least one time slot, L is a numerical value indicative of bits 0–15 of an encoded International Mobile Station Identity (IMSI) of a phone number, H is a numerical value indicative of bits 16–31 of the encoded IMSI of the phone number, S is tie size of PI bits associated with the bit associated with the further bit $R_2$ in a first frame or a second frame of the at least two frames, $L_{10}$ is a numerical value indicative of bits 0–9 of the encoded IMSI of the phone number, $DECORR_1$ is a numerical value that indicates a change of location of the bit associated with $R_1$ with respect to the t, and the t is a numerical value indicative of a number of 20 ms intervals from Jan. 6, 1980, 12:00 am.

2. The method of claim 1 further comprising alerting a device in the idle state over the channel based on the assigned bit associated with the $R_1$ and the further bit associated with the $R_2$.

3. The method of claim 2 wherein an indication constitutes the bit associated with the $R_1$ and the further bit associated with the $R_2$ wherein said alerting step includes sending the indication to a mobile station.

4. The method of claim 3 wherein the assigning step includes assigning the bit $R_1$ to within the portion of the at least two different frames within the portion of the at least one time slot.

5. The method of claim 4 wherein the further assigning step includes assigning the bit $R_2$ to within the further portion of the at least two different frames with the portion of the at least one time slot.

6. The method of claim 3, further comprising switching to a further channel.

7. The method of claim 6, further comprising transmitting a message over a further channel after the step of sending the indication.

8. A method for transmitting an alert message to a device in an idle state over a channel, said method comprising:
assigning a bit associated with a position $R_1$ in a bit stream to at least two frames of at least one time slot of the channel, wherein the $R_1$ has the following relation:

$$R_1 = \lfloor N \times ((40503 \times (L \oplus H \oplus DECORR_1)) \bmod 2^{16})/2^{16} \rfloor,$$

$$DECORR_1 = \lfloor \frac{t}{64} \rfloor \bmod 2^{16}$$

and
further assigning a further bit associated with a position $R_2$ in the bit stream of at least a further two frames of the at least one time slot of the channel, wherein the $R_2$ has the following relation:

$$R_2 = N + M + \lfloor \frac{2 \times R_1}{N+M} \rfloor \times \left(\frac{N+M}{2}\right) + \left(\left(\frac{L_{10}+M+1}{2^{10}} \times S + R_1\right) \bmod S\right)$$

$$S = \left|\left(\left(1 - \lfloor \frac{2 \times R_1}{N+M} \rfloor\right) \times \left(\frac{N+M}{2}\right) + \lfloor \frac{2 \times R_1}{N+M} \rfloor \times \left(\frac{N-M}{2}\right)\right)\right|$$

wherein M is a number of reserved and configuration change indicator ("CCI") bits associated with the bit associated with the $R_1$ and the further bit associated with the $R_2$ in the at least one time slot, N is a total number of paging indicator ("PI") bits associated with the bit associated with the $R_1$ or the further bit associated with the $R_2$ in the at least two frames of the at least one time slot, L is a numerical value indicative of bits 0–15 of an encoded International Mobile Station Identity (IMSI) of a phone number, H is a numerical value indicative of bits 16–31 of the encoded IMSI of the phone number, S is the size of PI bits associated with the bit associated with the further bit $R_2$ in a first frame or a second frame of the at least two frames, $L_{10}$ is a numerical value indicative of bits 0–9 of the encoded IMSI of the phone number, $DECORR_1$ is a numerical value that indicates a change of location of the bit associated with $R_1$ with respect to the t, and the t is a numerical value indicative of a number of 20 ms intervals from Jan. 6, 1980, 12:00 am.

9. The method of claim 8 further comprising alerting a device in the idle state over the channel based on the assigned bit associated with the $R_1$ and the further bit associated with the $R_2$.

10. An apparatus for alerting a remote device in an idle state over a channel, said method comprising:
a remote device configured to assign a bit associated with a position $R_1$ on the bit stream of the at least one time slot of the channel, wherein the $R_1$ has the following relation:

$$R_1 = \lfloor N \times ((40503 \times (L \oplus H \oplus DECORR_1)) \bmod 2^{16})/2^{16} \rfloor,$$

$$DECORR_1 = \lfloor \frac{t}{64} \rfloor \bmod 2^{16}; \text{ and}$$

further assigning a further bit associated with a position $R_2$ in the bit stream of at least a further two frames of the at least one time slot of the channel, wherein the $R_2$ has the following relation:

$$R_2 = N + M + \lfloor \frac{2 \times R_1}{N+M} \rfloor \times \left(\frac{N+M}{2}\right) + \left(\left(\frac{L_{10}+M+1}{2^{10}} \times S + R_1\right) \bmod S\right)$$

$$S = \left|\left(\left(1 - \lfloor \frac{2 \times R_1}{N+M} \rfloor\right) \times \left(\frac{N+M}{2}\right) + \lfloor \frac{2 \times R_1}{N+M} \rfloor \times \left(\frac{N-M}{2}\right)\right)\right|$$

wherein M is a number of reserved and configuration change indicator ("CCI") bits associated with the bit associated with the $R_1$ and the further bit associated with the $R_2$ in the at least one time slot, N is a total number of paging indicator ("PI") bits associated with the bit associated with the $R_1$ or the further bit associated wit the $R_2$ in the at least two frames of the at least one time slot, L is a numerical value indicative of bits 0–15 of an encoded International Mobile Station Identity (IMSI) of a phone number associated with the remote device, H is a numerical value indicative of bits 16–31 of the encoded IMSI of the phone number, S is the size of PI bits associated with the bit associated with the further bit $R_2$ in a first frame or a second frame of the at least two frames, $L_{10}$ is a numerical value indicative of bits 0–9 of the encoded IMSI of the phone number, $DECORR_1$ is a numerical value that indicates a change of location of the bit associated with $R_1$ with respect to the t, and the t is a numerical value indicative of a number of 20 ms intervals from Jan. 6, 1980, 12:00 am.

11. An apparatus for alerting a mobile station comprising:
a base station is configured to transmit an alert message to the mobile station in an idle state over a channel;
the mobile station configured to assign a bit associated with a position $R_1$ to at least two frames of at least one time slot of the channel, wherein the $R_1$ has the following relation;

$$R_1 = \lfloor N \times ((40503 \times (L \oplus H \oplus DECORR_1)) \bmod 2^{16})/2^{16} \rfloor,$$

$$DECORR_1 = \left\lfloor \frac{t}{64} \right\rfloor \bmod 2^{16}$$

and
the mobile station is also configured to assign a further bit associated with a position $R_2$ to at least a further two frames of the at least one time slot of the channel, wherein the $R_2$ has the following relation:

$$R_2 = N + M + \left\lfloor \frac{2 \times R_1}{N+M} \right\rfloor \times \left( \frac{N+M}{2} \right) + \left( \left( \frac{L_{10} + M + 1}{2^{10}} \times S + R_1 \right) \bmod S \right)$$

$$S = \left\lfloor \left( \left(1 - \left\lfloor \frac{2 \times R_1}{N+M} \right\rfloor \right) \times \left( \frac{N+M}{2} \right) + \left\lfloor \frac{2 \times R_1}{N+M} \right\rfloor \times \left( \frac{N-M}{2} \right) \right) \right\rfloor$$

wherein M is a number of reserved and configuration change indicator ("CCI") bits associated with the bit associated with the $R_1$ and the further bit associated with the $R_2$ in the at least one time slot, N is a total number of paging indicator ("PI") bits associated with the bit associated with the $R_1$ or the further bit associated with the $R_2$ in the at least two frames of the at least one time slot, L is a numerical value indicative of bits 0–15 of an encoded International Mobile Station Identity (IMSI) of a phone number associated with the mobile station, H is a numerical value indicative of bits 16–31 of the encoded IMSI of the phone number, S is the size of PI bits associated with the bit associated with the further bit $R_2$ in a first frame or a second frame of the at least two frames, $L_{10}$ is a numerical value indicative of bits 0–9 of the encoded IMSI of the phone number, $DECORR_1$ is a numerical value that indicates a change of location of the bit associated with $R_1$ with respect to the t, and the t is a numerical value indicative of a number of 20 ms intervals from Jan. 6, 1980, 12:00 am; and
alerting the mobile station in the idle state over the channel based on the assigned bit associated with the $R_1$ and the further bit associated with the $R_2$.

12. A method of alerting a device in an idle state comprising;
transmitting an alert message over a quick paging channel;
assigning a bit associated with a position $R_1$ in a bit stream to at least two frames of at least one time slot of the channel, wherein the $R_1$ has the following relation:

$$R_1 = \lfloor N \times ((40503 \times (L \oplus H \oplus DECORR_1)) \bmod 2^{16})/2^{16} \rfloor,$$

$$DECORR_1 = \left\lfloor \frac{t}{64} \right\rfloor \bmod 2^{16}$$

and
further assigning a further bit associated with a position $R_2$ in the bit stream to at least two further frames of the at least one time slot of the channel, wherein the $R_2$ has the following relation:

$$R_2 = N + M + \left\lfloor \frac{2 \times R_1}{N+M} \right\rfloor \times \left( \frac{N+M}{2} \right) + \left( \left( \frac{L_{10} + M + 1}{2^{10}} \times S + R_1 \right) \bmod S \right)$$

$$S = \left\lfloor \left( \left(1 - \left\lfloor \frac{2 \times R_1}{N+M} \right\rfloor \right) \times \left( \frac{N+M}{2} \right) + \left\lfloor \frac{2 \times R_1}{N+M} \right\rfloor \times \left( \frac{N-M}{2} \right) \right) \right\rfloor$$

wherein M is a number of reserved and configuration change indicator ("CCT") bits associated with the bit associated with the $R_1$ and the further bit associated with the $R_2$ in the at least one time slot, N is a total number of paging indicator ("PI") bits associated with the bit associated with the $R_1$ or the further bit associated with the $R_2$ in the at least two frames of the at least one time slot, L is a numerical value indicative of bits 0–15 of an encoded International Mobile Station Identity (IMSI) of a phone number, H is a numerical value indicative of bits 16–31 of the encoded IMSI of the phone number associated with the device, S is the size of PI bits associated wit the bit associated with the further bit $R_2$ in a first frame or a second frame of the at least two frames, $L_{10}$ is a numerical value indicative of bits 0–9 of the encoded IMSI of the phone number, $DECORR_1$ is a numerical value that indicates a change of location of the bit associated with $R_1$ with respect to the t, and the t is a numerical value indicative of a number of 20 ms intervals from Jan. 6, 1980, 12:00 am.; and
alerting the device in the idle state over the channel based on the assigned bit associated with the $R_1$ and the further bit associated with the $R_2$.

13. A method of alerting a device in an idle state over a channel, said method comprising:
assigning a bit associated with a position $R_1$ in a bit stream of at least two frames of at least one time slot of the channel, wherein the bit $R_1$ has the following relation:

$$R_1 = \lfloor N \times ((40503 \times (L \oplus H \oplus DECORR_1)) \bmod 2^{16})/2^{16} \rfloor,$$

$$DECORR_1 = \left\lfloor \frac{t}{64} \right\rfloor \bmod 2^{16}; \text{ and}$$

further assigning a further bit associated with a position $R_2$ in the bit stream of at least two further frames of the at least one time slot of the channel, wherein the $R_2$ has the following relation:

$$R_2 = N + M + \left\lfloor \frac{2 \times R_1}{N+M} \right\rfloor \times \left(\frac{N+M}{2}\right) + \left(\left(\frac{L_{10}+M+1}{2^{10}} \times S + R_1\right) \bmod S\right)$$

$$S = \left\lfloor \left(\left(1 - \left\lfloor \frac{2 \times R_1}{N+M} \right\rfloor\right) \times \left(\frac{N+M}{2}\right) + \left\lfloor \frac{2 \times R_1}{N+M} \right\rfloor \times \left(\frac{N-M}{2}\right)\right)\right\rfloor$$

wherein M is a number of reserved and configuration change indicator ("CCT") bits associated with the bit associated with the $R_1$ and the further bit associated with the $R_2$ in the at least one time slot, N is a total number of paging indicator ("PI") bits associated with the bit associated with the $R_1$ or the further bit associated with the $R_2$ in the at least two frames of the at least one time slot, L is a numerical value indicative of bits 0–15 of an encoded International Mobile Station Identity (IMSI) of a phone number, H is numerical value indicative of bits 16–31 of the encoded IMSI of the phone number, S is the size of PI bits associated with the bit associated with the further bit $R_2$ in a first frame or a second frame of the at least two frames $L_{10}$ is a numerical value indicative of bits 0–9 of the encoded IMSI of the phone number, $DECORR_1$ is a numerical value that indicates a change of location of the bit associated with $R_1$ with respect to the t, and the t is a numerical value indicative of a number of 20 ms interval from Jan. 6, 1980, 12:00 am.

\* \* \* \* \*